UNITED STATES PATENT OFFICE.

JOHN ARBUCKLE, OF BROOKLYN, NEW YORK.

IMPROVEMENT IN PROCESSES FOR SEPARATING STONES, &c., FROM GRAIN, &c.

Specification forming part of Letters Patent No. 196,178, dated October 16, 1877; application filed April 4, 1877.

*To all whom it may concern:*

Be it known that I, JOHN ARBUCKLE, of Brooklyn, in the county of Kings and State of New York, have invented a new and Improved Process for Separating Stones and other Impurities from Grain and other Materials, which invention is fully set forth in the following specification:

The object of my invention is to remove stones and other impurities of greater specific gravity than water from grain, corn, coffee, and other similar materials, and it is based on the fact that said materials, when thrown into water in a green state, sink down with the stones and other like impurities mixed therewith; but when the grain, corn, or coffee is heated or roasted, and, while still hot, thrown into water, the kernels or beans, having been expanded by the heat, float on the water, while the stones and other like impurities sink down.

In carrying out my invention, I place the grain, corn, coffee, or other like material into a drum or roaster of any suitable construction, and, after having heated the same until all the moisture contained in said grain or other material has been driven out, I dump the contents of the drum, in a heated state, into a tank filled with water. The kernels or beans, having been expanded by the heat, float on the water and are immediately skimmed off, while the stones and other like impurities mixed with the grain, corn, or coffee sink to the bottom.

My invention is of particular value for the purpose of removing stones from roasted coffee; and I have found that, by dumping the roasted coffee while hot into water, the beans not only float, but they also repel the water, so that when they are removed from the water within a short time they appear perfectly dry. When the coffee is being glazed, during the operation of roasting, it can be allowed to cool before it is dumped into the water, since the beans, after having been coated with some material insoluble in water, will float on the water without absorbing any portion thereof; but, in practice, I prefer to dump the grain, corn, or coffee directly from the heating-drum or roaster into water.

What I claim as new, and desire to secure by Letters Patent, is—

The within-described process of separating stones or other like impurities from grain, corn, coffee, or other similar materials, by heating said materials and dumping the kernels or beans while hot into a tank containing water, whereby the stones or other like impurities are caused to sink down, while the kernels or beans can be skimmed off from the surface of the water, substantially as set forth.

In testimony that I claim the foregoing I have hereunto set my hand and seal this 28th day of March, 1877.

JOHN ARBUCKLE. [L. S.]

Witnesses:
J. VAN SANTVOORD,
E. F. KASTENHUBER.